United States Patent [19]

Tseung et al.

[11] 4,335,754
[45] Jun. 22, 1982

[54] PREVENTION OF HYDROGEN EMBRITTLEMENT OF METALS IN CORROSIVE ENVIRONMENTS

[76] Inventors: Alfred C. C. Tseung, 60 Grove Ave., London N10 2AN, England; Anthony I. Onuchukwu, c/o Bayero University, PMB 3011, Kano, Nigeria; Ho C. Chan, 63 Church Way, London N20 OJZ, England

[21] Appl. No.: 209,481

[22] Filed: Nov. 24, 1980

[30] Foreign Application Priority Data

Nov. 28, 1979 [GB] United Kingdom ................ 7941116

[51] Int. Cl.$^3$ .............................................. F16L 9/14
[52] U.S. Cl. .................................. 138/146; 106/14.44; 106/14.45; 148/6.24; 252/387; 252/389 R; 427/383.7; 427/386; 427/388.1; 427/409; 427/410; 428/36
[58] Field of Search ......... 138/145, 146, 177, DIG. 3, 138/DIG. 6, DIG. 7; 204/147, 196; 428/36; 525/4, 3; 928/485; 427/410, 386, 409, 388.1, 383.7; 423/511, 561 R, 562, DIG. 8; 252/387, 389 R; 148/6.24; 106/14.05, 14.45, 14.44; 422/6, 7, 8, 1

[56] References Cited

U.S. PATENT DOCUMENTS

| 2,431,997 | 12/1947 | Rose ..................................... 423/511 |
| 3,147,204 | 9/1964 | Shepard et al. ..................... 204/147 |
| 3,973,056 | 8/1976 | Fessler et al. ................. 138/DIG. 6 |
| 4,040,447 | 8/1977 | Scott ............................... 204/147 X |
| 4,268,579 | 5/1981 | Suzuki et al. ................... 427/410 X |

FOREIGN PATENT DOCUMENTS

| 941983 | 11/1963 | United Kingdom . |
| 1014587 | 12/1965 | United Kingdom . |
| 1421708 | 1/1976 | United Kingdom . |
| 1461764 | 1/1977 | United Kingdom . |
| 1556452 | 11/1979 | United Kingdom . |

Primary Examiner—Norman Morgenstern
Assistant Examiner—Thurman K. Page
Attorney, Agent, or Firm—Mason, Fenwick & Lawrence

[57] ABSTRACT

Metal substrates in corrosive environments such as gas and oil pipelines, are normally prone to embrittlement caused by absorption of the hydrogen which is cathodically evolved during various corrosion processes. This is substantially prevented by providing an active substance in the vicinity of the metal substrate, and in electrical contact therewith, the active substance being one on which cathodic hydrogen evolution occurs in preference to the metal, thereby reducing the amount of hydrogen available for diffusion into the substrate. The active substrate is preferably a sulphide, for example FeS, or mixed sulphide, for example NiCo$_2$S$_4$, and is advantageously applied as a coating on the surface of the substrate, a further coating of, for example, a thermosetting resin, preferably being employed for mechanical and environmental protection.

19 Claims, 10 Drawing Figures

PREVENTION OF HYDROGEN EMBRITTLEMENT OF METALS IN CORROSIVE ENVIRONMENTS

This invention relates to the protection of metal substrates against corrosion and other related degradative processes.

One major problem encountered in offshore oil and gas pipelines is their susceptibility to corrosion, the problem being especially serious in the riser pipes which carry the hot oil or gas from the ocean bed to the underwater pipes which transport the fuel to the shore. The riser pipes are subjected to considerable stress caused by the oil or gas pressure as well as the pounding action of the waves. Amongst other situations where metal substrates, especially pipes, are subjected to stress as well as corrosive agents there may also be mentioned, for example, the hydraulic lines of high speed aircraft and the pipelines of chemical plants.

The internal corrosion of pipelines and other equipment is encountered in most oil and gas production units. The degree of attack varies from site to site and from time to time during the life of the production well and as production procedures and rates are changed because the corrosion rates and mechanisms are dependent upon many parameters, including, for example, the amount of water entrained in the gas or crude oil, the presence and concentration of $CO_2$ and/or $H_2S$, the pH, the salt content and the presence of oxygen. In general, however, the corrosion can be classified into two types, namely "sweet" corrosion, due to the presence of $CO_2$ and water, and "sour" corrosion, due to the presence of $H_2S$.

The present invention is based on our observation that a major factor contributing to the deterioration of metal substrates, such as steel pipes, in corrosive environments, especially when under mechanical stress in the presence of sea water and $H_2S$, is embrittlement caused by absorption of the hydrogen which is cathodically evolved during other corrosion processes.

Hitherto various measures have been taken to prevent hydrogen embrittlement, including,
(a) Design: by eliminating abrupt changes in flow direction, the corrosion caused at local sites is minimized.
(b) Proper choice of materials: this is, however, often constrained by cost and practical considerations. In certain areas chromium steels have been used but mechanical requirements and the possibility of their cracking in high chloride, high temperature, environments restricts their large scale use.
(c) Coatings: these have the disadvantage that, over a period of time, pores and cracks develop and severe localized attack results.
(d) Inhibitors: most favoured at present, these are basically organic compounds incorporating active polar groups, usually containing sulphur, nitrogen or phosphorous atoms, eg alkylamines or amides. These compounds absorb on the metal surface and retard the rate of the electrochemical reactions. However, these inhibitors have to be added continuously or at frequent intervals and are relatively ineffective in sour pipes because they are unable to prevent the reaction between $H_2S$ and steel.

The present invention is based on our observation that hydrogen embrittlement of steel and other metals in corrosive environments may substantially be prevented by providing in the environment of the metal substrate and in electrical contact therewith, an active substance, preferably a sulphide or a mixed sulphide, on which cathodic hydrogen evolution occurs in preference to the metal, thereby greatly reducing the amount of hydrogen available for diffusion into the metal surface.

The present invention accordingly provides a method of protecting a metal substrate in a corrosive environment against hydrogen embrittlement which comprises providing, in the vicinity of the substrate and in electrical contact therewith, an active substance which has a low over-potential for the cathodic evolution of hydrogen.

The active substance, on which the hydrogen is preferentially cathodically evolved in accordance with the present invention, may be applied in a variety of forms. For example, it may be applied in the form of or as a coating on, a separate member, eg. an electrode which is in electrical contact with the metal substrate. Alternatively, it may be applied as a coating on, or incorporated in a coating composition which is coated on the metal substrate. In yet other embodiments, the active substance may be formed in situ on the metal substrate or an electrically connected member, as will be described in more detail hereinafter. Combinations of these and other methods of application may also be employed. The active substance may, of course, be provided before the metal substrate is exposed to the corrosive environment (the term "corrosive environment" as used herein meaning an environment where chemical and/or electrochemical reactions leading to hydrogen embrittlement are liable to occur) and/or may be provided whilst the metal substrate is so exposed.

The active substance must have an electrical connection to the substrate. In most cases this will be achieved by providing it in the form of a coating or as a separate electrode which is in continuous electrical contact with the substrate. However, in some cases it may be sufficient to add the substrate as a powder dispersed in a liquid which passes through or over the substrate, especially a liquid flowing in a closed circuit within a pipe, because the powder particles will from time to time come into contact with the walls of the pipe.

The active substance has a low over-potential for the cathodic evolution of hydrogen in accordance with the equation:

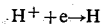
$$H^+ + e \rightarrow H$$

The exact value of the over-potential will, of course, vary according to the electrical and chemical conditions, but those skilled in the art will understand that, under a given set of conditions, the over-potential of the active substance should be considerably less than that of the metal substrate and they will accordingly be able to select an appropriate active substance for a particular situation.

Especially suitable active substances for use in the present invention are the catalytic compounds described in British Patent Specification No. 1,556,452, the disclosures of which are incorporated herein by reference. These compounds comprise sulphur, optionally together with oxygen, and at least two metals selected from cobalt, nickel, iron and manganese. Preferred compounds have the formula

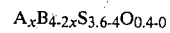
$$A_xB_{4-2x}S_{3.6-4}O_{0.4-0}$$

where x is 0.05 to 1.95 and A and B are any different two metals selected from Co, Ni, Fe and Mn, eg. Co and Ni; $NiCo_2S_4$ being especially preferred.

These compounds, which may be prepared by treating the corresponding mixed oxides with a sulphur-containing compound, such as $H_2S$ or $CS_2$, may be provided as porous particles formed by incorporating them with a suitable chemically inert binder, especially polytetrafluoroethylene (PTFE). As described in British Patent Specification No. 1,556,452 the porous particles, which typically comprise from 1 to 10, preferably from 2 to 6, parts by weight of binder for each 10 parts of the active compound, may be assembled to form an "electrode", eg by painting a dispersion of them in the binder on a suitable support, such as a nickel screen, and then air drying and curing.

The particles typically have an active surface (to a depth of at least 20 A) comprising the mixed sulphide, and suitable particle sizes can be readily achieved by freeze-drying the mixed oxides from which they are prepared (as described in British Patent Specification No. 1,461,764).

One particularly preferred active substance comprises 3 parts PTFE and 10 parts $NiCo_2S_4$.

In accordance with the present invention an electrode of the type described in British Patent Specification No. 1,556,452 may be electrically connected to the metal substrate to be protected against hydrogen embrittlement. One application in which such a technique may appropriately be used is in the protection against hydrogen embrittlement of a substrate which is being electroplated. However, the technique will not, in general, be suitable for use in the protection of pipelines etc. and, for such applications, it is preferred to coat the active substance directly onto the surface to be protected. This may be conveniently effected by coating the surface of the substrate with a solution of the mixed oxide (or a precursor thereof, such as a mixture of metal nitrates, which will decompose on heating), with or without a chemically inert binder, and then converting the mixed oxide by treatment with $H_2S$ or another sulphur-containing compound, eg. $CS_2$, which may be preferable in certain applications because it will reduce the possibility of hydrogen permeation into the substrate during the coating process.

In other applications, the mixed sulphide may be applied to the substrate as an ingredient in a paint or similar coating composition (care being taken that it does not become electrically insulated within the composition so that electrical continuity is lost).

Alternatively, the active substance may advantageously be applied as a coating to the metal substrate by electrophoretic deposition; such a technique is especially suitable for the internal coating of pipes on an industrial scale. For example $NiCo_2S_4$/PTFE dispersion may be electrophoretically deposited onto steel substrates followed by optional air drying and curing, eg at a temperature of from 300° to 350° C.

It will, of course, be appreciated that other methods of applying the active substance, either per se or as part of a coating composition, may appropriately be used.

Using $NiCo_2S_4$ we achieved a current density of 1.3 $A/cm^2$ in 5NKOH at 70° C. and $-150$ mV vs. RHE for over 3000 hours which is comparable to the performance of platinum black. Our more recent studies have further shown that this active substance gives a current density of over 250 $mA/cm^2$ at $-50$ mV vs. RHE under chlor-alkali conditions, ie, in a 17% NaCl/15% NaOH solution at 75° C., compared to 250 $mA/cm^2$ at $-200$ mV vs. RHE for mild steel cathodes under similar conditions.

However, although the use of mixed sulphides described above as active substances is preferred in many applications of the present invention, it will be understood that many other compounds may be used. In this respect, we have surprisingly found that iron sulphide exhibits a surprisingly low over-potential for the cathodic evolution of hydrogen and, accordingly, is especially suitable as an active substance for use, in accordance with the present invention, with steel substrates because it can readily be formed as a coating in situ. For instance, a coating of rust which has naturally or deliberately been formed on the steel surface can readily be converted to FeS by treatment with a suitable sulphur-containing compound such as $H_2S$ or $CS_2$. Alternatively, a FeS coating may, for example, be applied in situ on an unoxidized steel surface by anodization followed by treatment with $H_2S^2$ under alkaline conditions, or by treatment with a mixture of iron chlorides ($FeCl_2 + FeCl_3$) and $H_2S$ in the presence of an alkali such as sodium hydroxide.

The iron sulphide should have a relatively high surface area, eg greater than 2 $m^2/g$, preferably greater than 4 $m^2/g$ and the coating preferably has a surface area which is at least 5 times, and preferably at least 10 times, that of the geometric area of metal substrate.

In some applications, the sulphidizing ingredient may simply be added to, or may already be present in, the fluid flowing through the steel pipe and the present invention accordingly contemplates the addition of such an ingredient as a method of forming the sulphide (or any other active substance) in situ during the normal operation of the apparatus comprising the metal substrate which is to be protected even though, in general, it will be preferred to apply the active substance to the substrate before it is subjected to the corrosive and embrittling environment.

In summary, although the use of sulphides as active substances as described above is preferred (because, amongst other things, they are not prone to attack by the $H_2S$ present in "sour" pipes) it will be appreciated that the present invention is based on the general observation that the provision of an active substance with a low over-potential for hydrogen evolution can effectively eliminate or at least substantially reduce the problem of hydrogen embrittlement of metal, especially steel, substrates and that the invention is not limited to the nature of the active substance or to the manner to which it is provided so that it may form a preferential site for hydrogen evolution remote from the substrate. Equally, however, it will be appreciated that the chosen active substance must be applied in an amount effective to prevent or at least substantially to reduce hydrogen evolution on the surface of the metal substrate. In general this will mean that, when the active substance is applied as, or as part of, a coating the coating will be continuous (at least so as to ensure electrical continuity) and will have a thickness sufficient to form a discrete layer. In practice, the thickness of the coating will be suitably at least 0.0001 cm and, preferably at least 0.001 cm, thicknesses within the range of from 0.001 cm to 0.01 cm being especially preferred.

In most applications, it will be preferable to provide an additional protective, non-conducting and impervious coating over the coating of the active substance. Apart from providing desirable physical protection to the coating of the active substance, the additional layer has the further advantage of minimizing the cathodic surface exposed when, as sometimes happens, a crack develops in the active coating thus exposing the underlying metal surface. This protective layer thereby substantially reduces the risk of widespread corrosion and/or embrittlement developing from a small crack in the coating.

The protective coating may comprise any of the materials conventionally employed for the protection of pipelines, including thermosetting and thermoplastics polymers. Especially preferred are fusion-bonded epoxy resin coatings such as Scotchkote (Trade Mark) sold by 3M Corporation. However, other materials, such as polyester resins, polyamides, polyimides, fluorcarbons, polyolefins, etc., may be employed. The coatings may be applied by conventional methods, including, in certain applications, the use of preformed heat-recoverable tubes and sleeves, e.g. wrap-around sleeves, which shrink down about the pipes when heated to form a tight protective environmental seal.

It will be appreciated that the active substance used in the present invention may be employed together with one or more other corrosion inhibiting materials.

DETAILED DESCRIPTION OF THE PREFERRED EMBODIMENT

EXAMPLE 1

A PTFE bonded $NiCo_2S_4$ electrode, supported on a 100 mesh nickel screen was prepared as described in Example 1 of British Patent Specification No. 1,556,452.

The performance of this electrode in cathodic hydrogen evolution was then evaluated and compared with the performance of a steel electrode as follows:

The cell used was as described by Devanethan and Stachurski (Proc. Roy. Soc., A270, pp90-102, 1962 and J. Electrochem. Soc. Vol. III No. 5; P169-623, 1964). Basically this cell consists of 1 cm² steel membrane placed between two compartments. In one compartment the membrane was polarised cathodically to evolve hydrogen, a piece of platinum foil being used as the counter electrode. The potential of the membrane was measured against a standard calomel electrode (SCE), the potential being controlled by a Chemical Electronics Potentiostat.

The other side of the membrane was anodically polarised (again controlled by a Potentiostat) so that any hydrogen diffusing through would have been oxidised. The value of the anodic current was then directly related to the rate of hydrogen diffusion.

Figure 1:
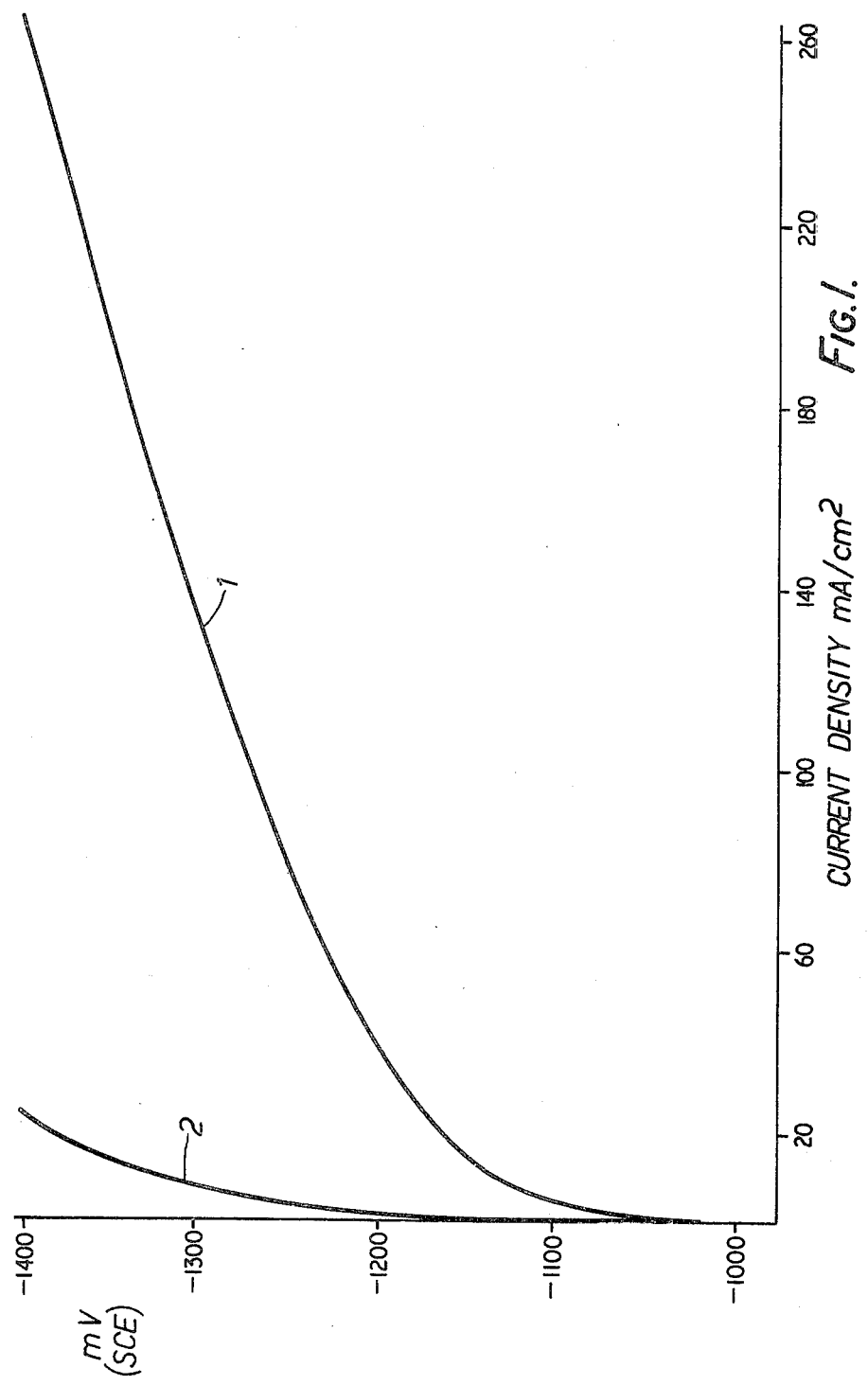
FIGS. 1, 4 and 8 show current-voltage curves for various examples of the invention tested under various conditions as described hereinafter.

FIG. 1 shows the current-voltage curves for the PTFE bonded $NiCo_2S_4$ electrode (curve 1) and the EN42 steel membrane (curve 2). It will be seen that the $H_2$ evolution overvoltage on $NiCo_2S_4$ was very much lower than that on steel. Thus, were the $NiCo_2S_4$ electrode and the steel to be electrically connected, the hydrogen evolution reaction would occur mainly on the $NiCo_2S_4$ surface and protect the steel against hydrogen embrittlement.

Figure 2:
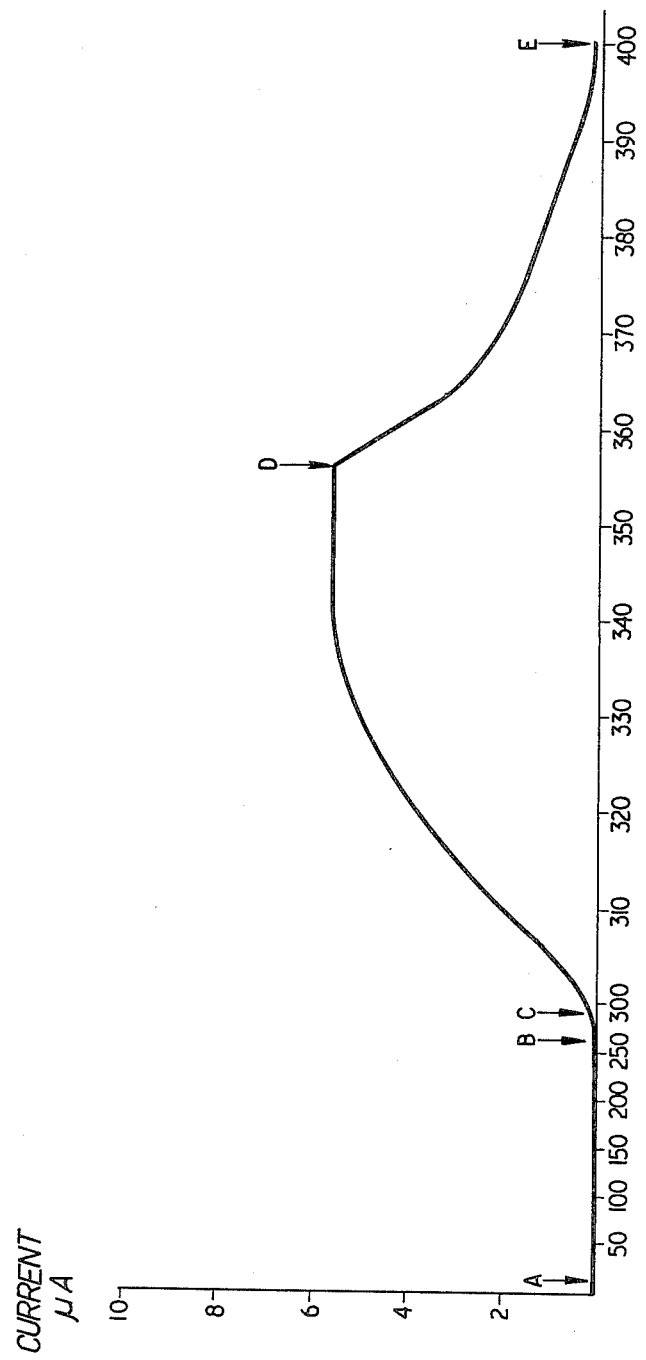
FIGS. 2, 3, 5, 6, 7, 9 and 10 show current-time curves for various examples of the invention tested under various conditions as described hereinafter.

This is shown in FIG. 2 in which a 1 cm² piece of PTFE bonded $NiCo_2S_4$ was connected electrically to the hydrogen evolution side of the steel membrane in the cell. As can be seen from FIG. 2, there was substantially no hydrogen diffusion through the steel membrane when the electrode was disconnected (C), the anodic current built up, indicating hydrogen diffusion, until the electrode was reconnected (D) when it dropped back to its original low value (E).

Figure 3:
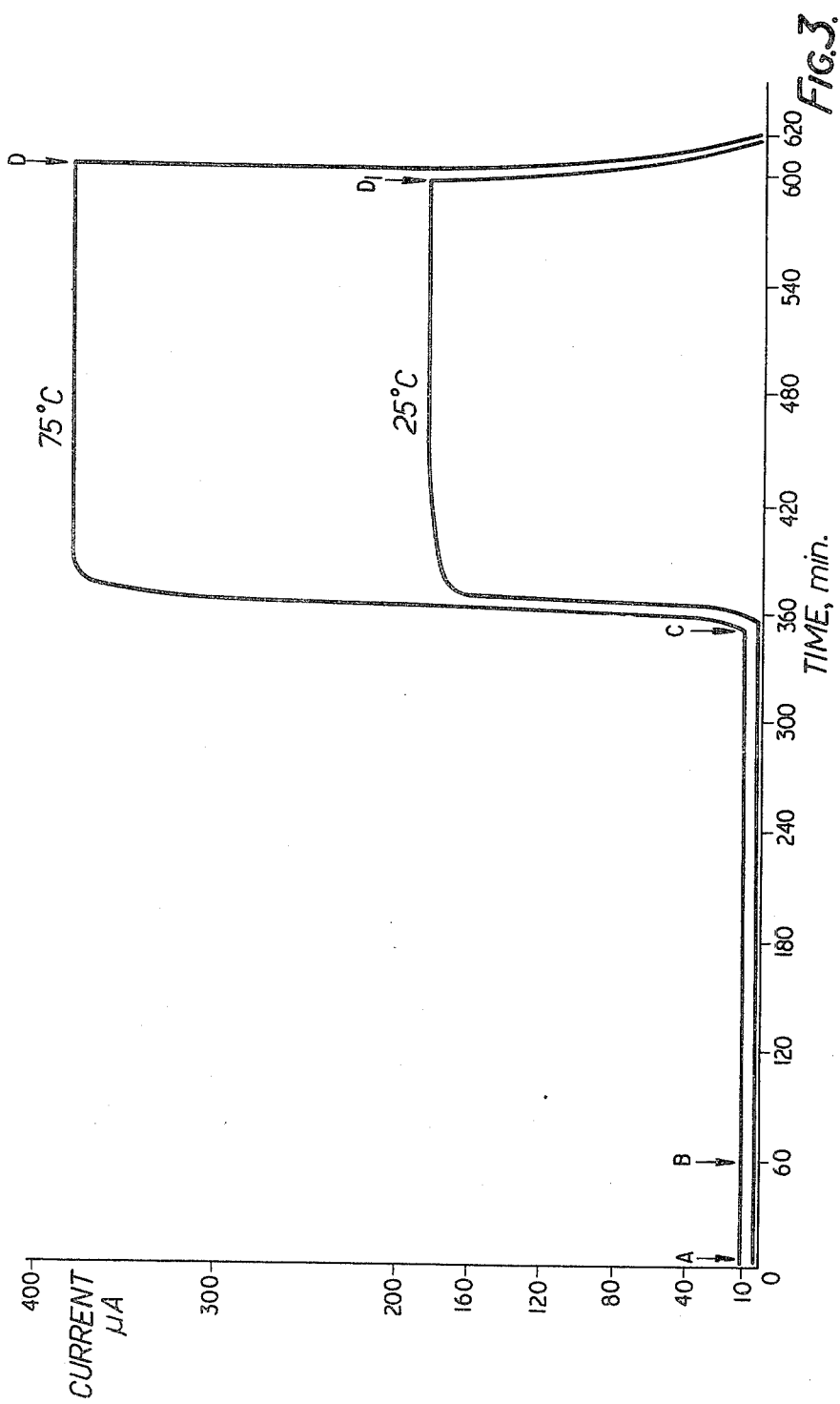

FIG. 3 shows a similar pattern for tests carried out in the presence of $H_2S$ (applied as a flowing stream of 100% $H_2S$) at 25° C. and 75° C., again using 0.1 M KOH as the electrolyte.

Figure 4:
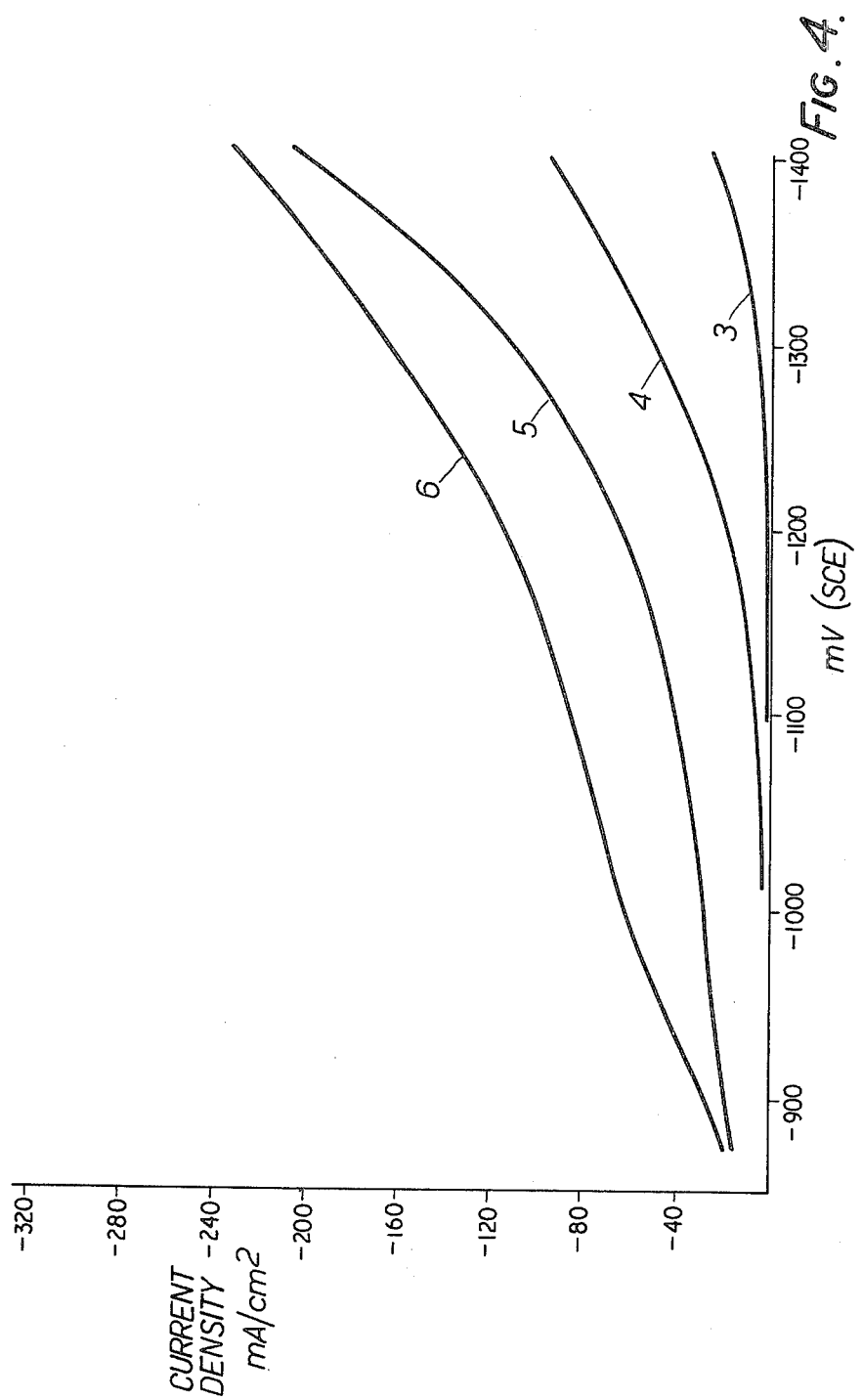
Figure 5:
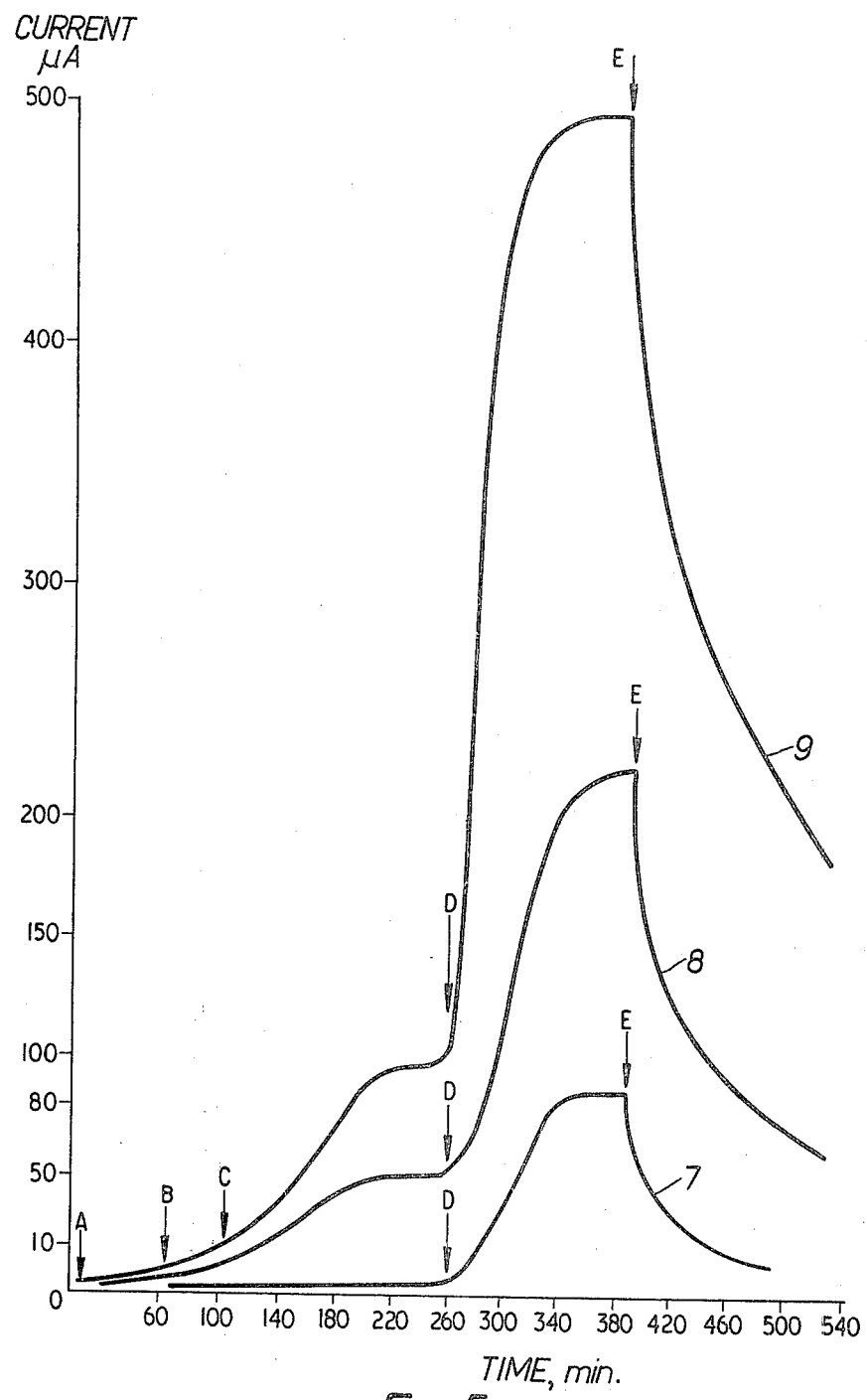

FIGS. 4 and 5 illustrate similar results obtained using 3% NaCl solution as the electrolyte in the presence and absence of $H_2S$. In FIG. 4, the experiment carried out was that described above with reference to FIG. 1, curve 3 being the current-voltage curve for EN42 steel in the electrolyte at 20° C. and curve 4 being for the $NiCo_2S_4$ electrode in the same conditions. Curves 5 and 6 are for EN42 steel and $NiCo_2S_4$ respectively, under the same conditions but in the presence of $H_2S$.

FIG. 5 shows the results of an experiment similar to that described above with reference to FIGS. 2 and 3, curve 7 being at 25° in the absence of $H_2S$, curve 8 being at 25° C. in the presence of $H_2S$, and curve 9 being at 75° C. in the presence of $H_2S$. In each curve A represents the connection of the steel membrane and the PTFE/$NiCo_2S_4$/nickel screen electrode, B represents the commencement of galvanostatic $H_2$ discharge at 10 mA/cm², C the introduction of $H_2S$ gas, D the disconnection of the membrane and the electrode, and E their reconnection.

EXAMPLE 2

In this example, the active substance, $NiCo_2S_4$, was applied as a coating.

A 1 cm², 0.0381 cm thick EN42 steel membrane was roughened with coarse emery paper. 2.05 g of Analar nickel nitrate and 4.10 of cobalt nitrate were dissolved in 10 cc of distilled water. This solution was pipetted onto one side of the membrane, which was then heated at 100° C. for 2 hours in an oven, the temperature being subsequently raised to 400° C. for one hour. The membrane was then transferred to a tube furnace and heated at 300° C. for 10 hours whilst a continuous stream of $H_2S$ was passed over it. The sulphur content of the $NiCo_2S_4$ coating was 24.8% (the electrical resistivity of the coating was 0.8 ohm and the thickness was about 0.0086 cm).

Figure 6:
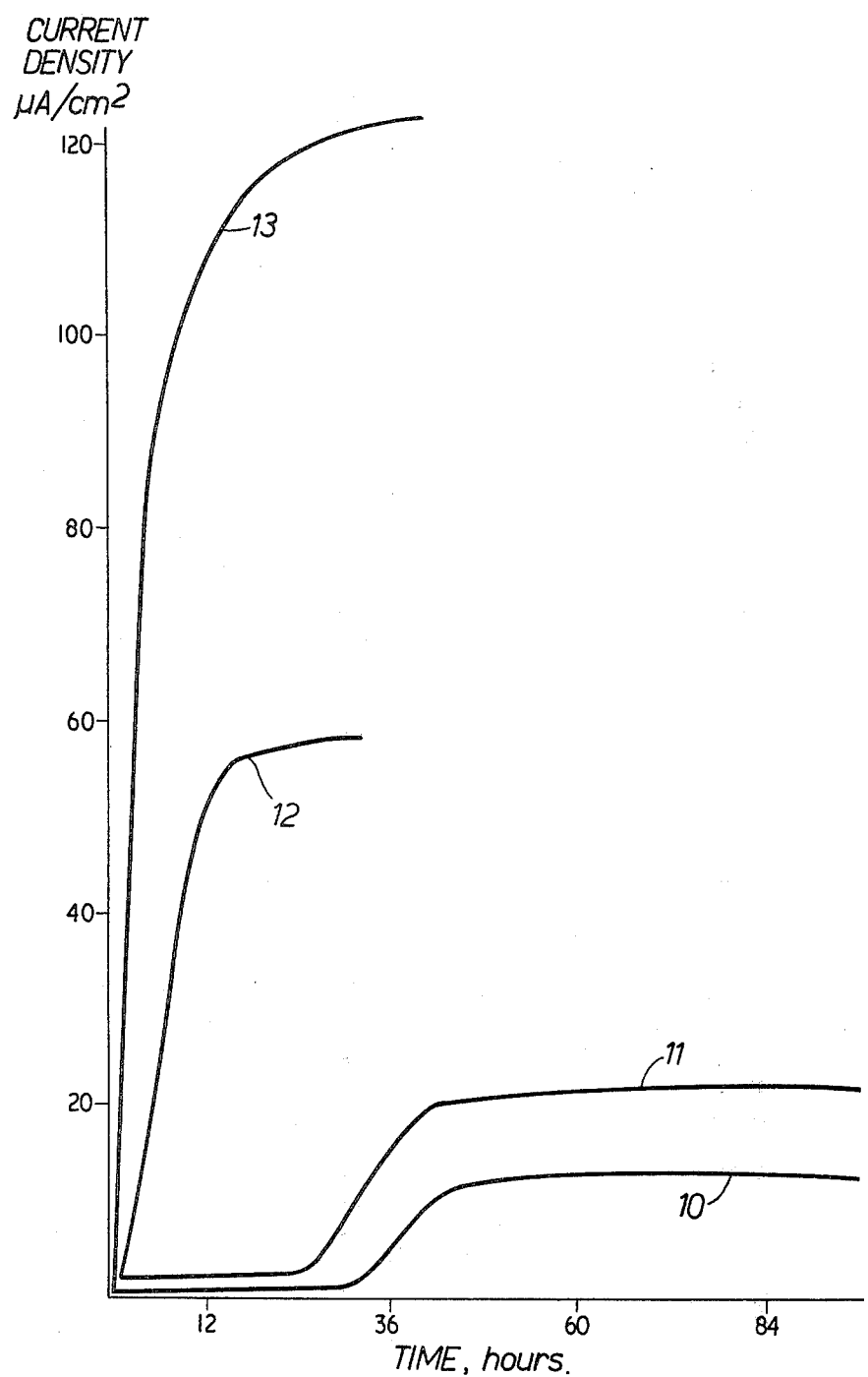

The sample and an uncoated sample were then tested in a two compartment cell as described above. FIG. 6 shows that the results for the $NiCo_2S_4$ coated steel are are more promising than the uncoated specimen (12 μA/cm² as opposed to 55 μA/cm² for an unprotected specimen; 26 μA/cm² as opposed to 124 μA/cm² at 75° C.). All the tests were conducted in 3% NaCl solutions in flowing $H_2S$. In all these tests, the side of the membrane which was exposed to $H_2S$ was not subjected to galvanostatic control. Thus, the effect of $H_2S$ dissociation on the $H_2$ permeation rate was evaluated the other side of the membrane was controlled at an anodic potential, −420 mV vs SCE, to Oxidize $H_2$). In FIG. 6, curve 10 is for the coated membrane at 25° C., curve 11 for the coated membrane at 75° C., curve 12 for the uncoated membrane at 25° C. and curve 13 for the uncoated membrane at 75° C.

Figure 7:
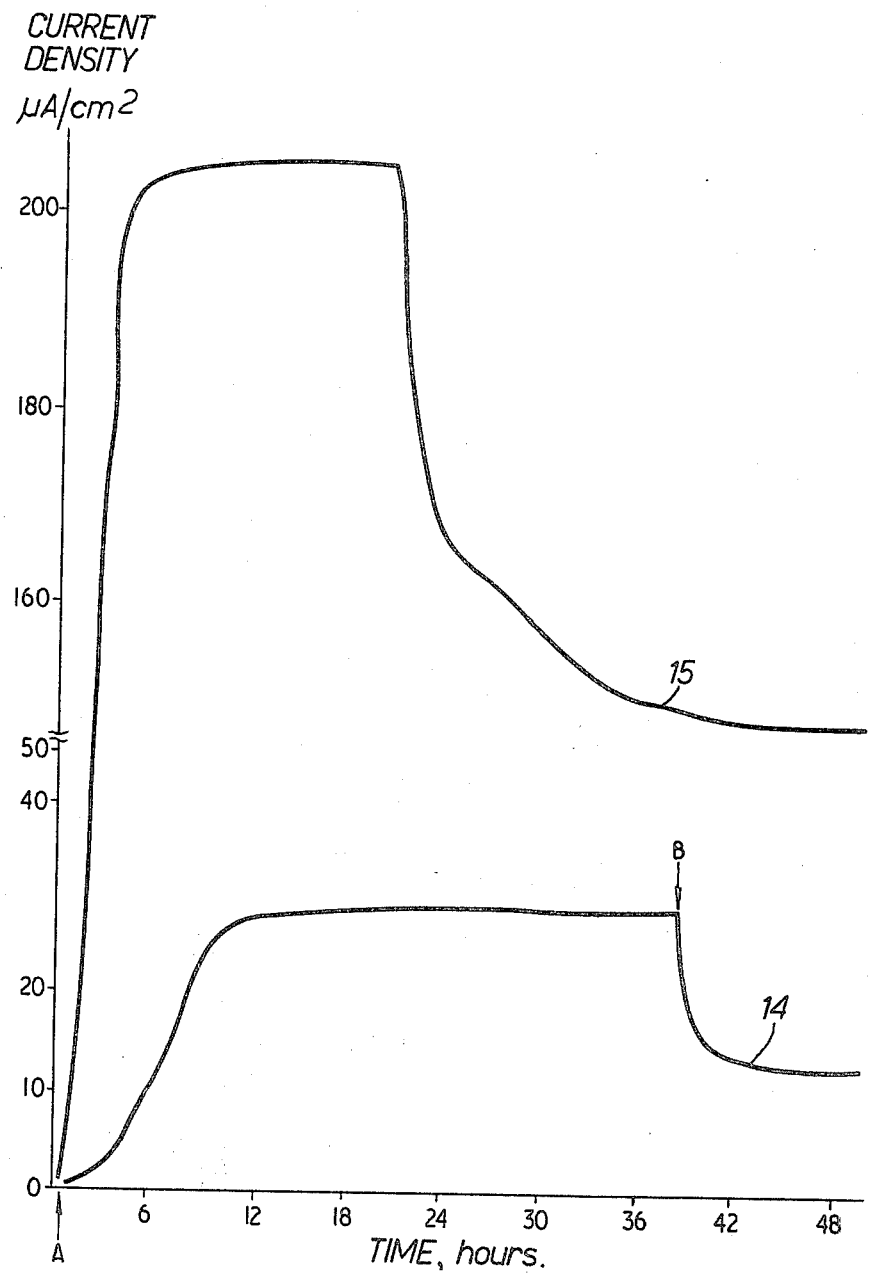

FIG. 7 shows the effect of holding the potential of the $H_2S$ side at cathodic potential to evolve $H_2$ (10 $mA/cm^2$). This again shows that the $NiCo_2S_4$ coated specimen is far better than the unprotected specimen in reducing the rate of $H_2$ permeation, curve 14 being for the coated membrane at 25° C. and curve 15 being for the uncoated membrane at 25° C., and A and B representing the start and termination, respectively, of the discharge current of 10 $mA/cm^2$.

EXAMPLE 3

Figure 8:
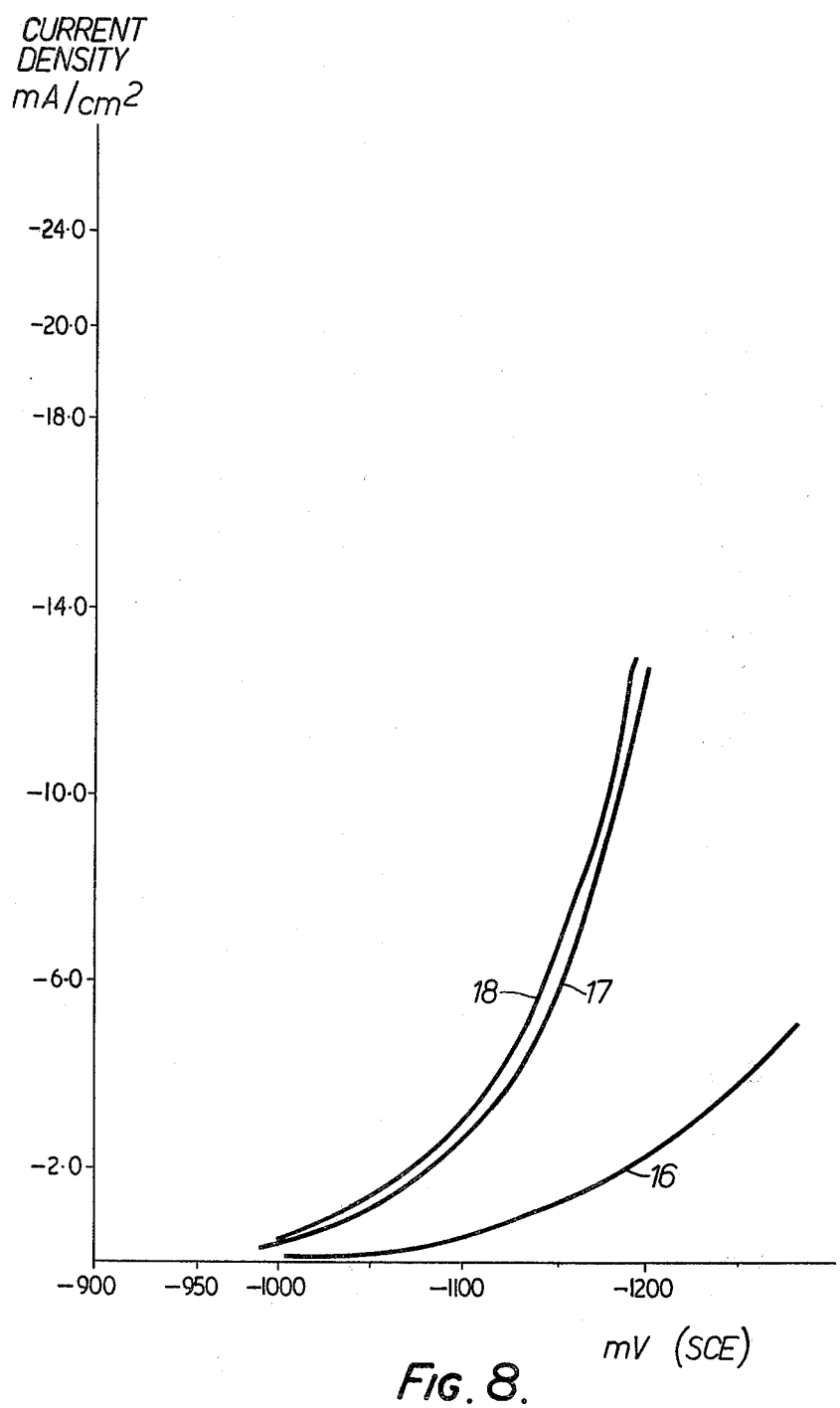

FIG. 8 shows iR corrected current-voltage curves which were obtained in a cell as described with reference to FIG. 1, again using a platinum screen counter electrode, the electrolyte being 3% NaCl solution at 25° C.

Curve 16 represents the performance of the uncoated steel membrane, Curve 17 a steel membrane which has been allowed to rust and then treated with $H_2S$ so as to provide a coating of iron sulphide and Curve 18 a membrane which has been coated with FeS in situ by anodisation at $-250$ mV vs. SCE for 90 minutes followed by treatment with $H_2S$ in 3.5% NaCl.

It will be seen that the hydrogen evolution overpotential for the FeS coated membranes was much lower than that of the uncoated membrane, indicating that FeS may be used as an active substance to prevent hydrogen embrittlement.

Figure 9:
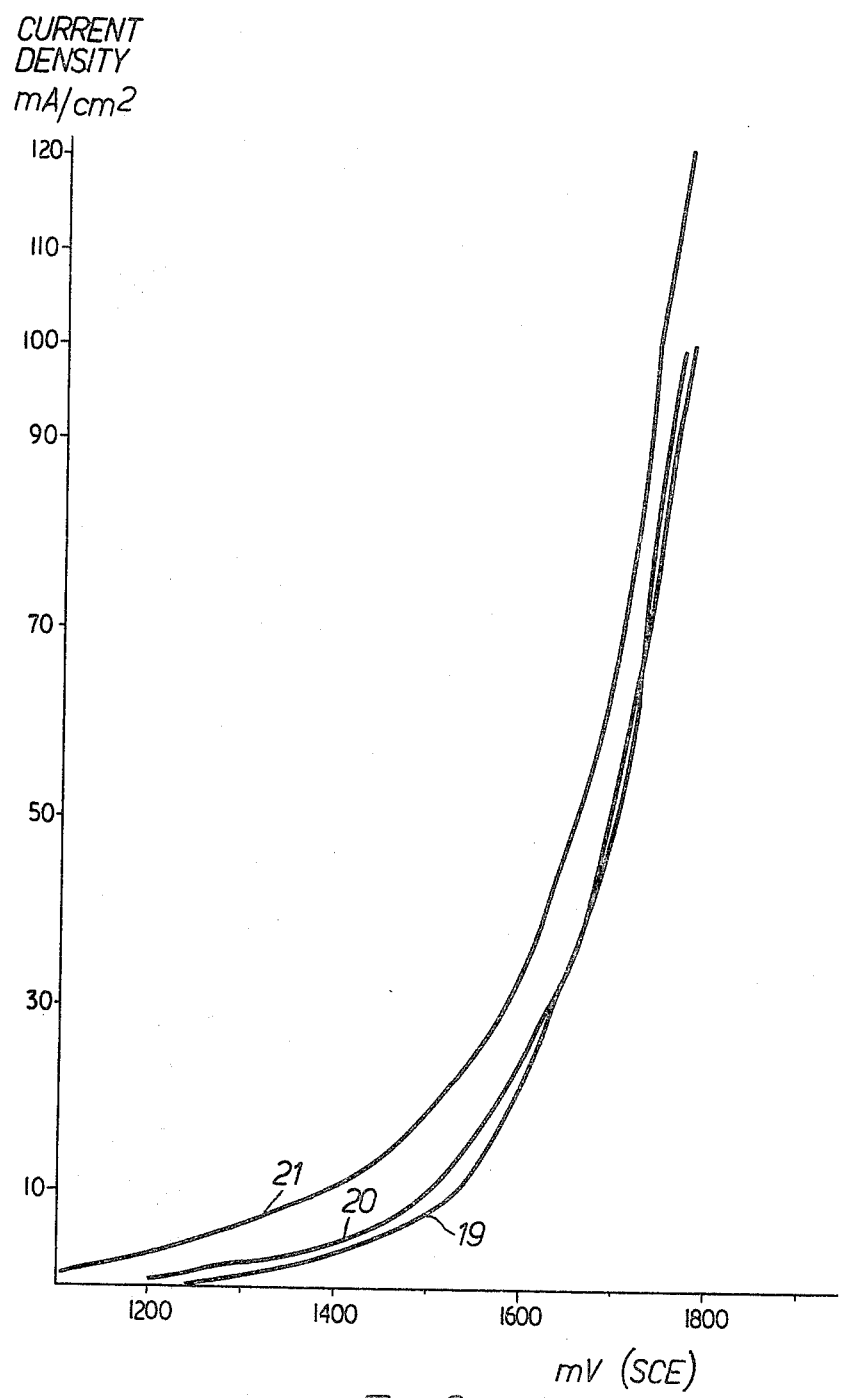

This is borne out by FIG. 9 which shows the iR corrected current-voltage curves 19, 20 and 21 for a steel membrane coated with FeS by treatment with $FeCl_2/FeCl_3/NaOH$ followed by $H_2S$; a steel membrane rusted and treated with $H_2S$ to produce an FeS coating; and a steel membrane coated with PTFE/$NiCo_2S_4$, respectively. It will be seen that the performance of the FeS-coated electrodes is very similar to that of the $NiCo_2S_4$ electrode.

The tests were carried out at 35° C. using 3% NaCl solution as the electrolyte.

Figure 10:
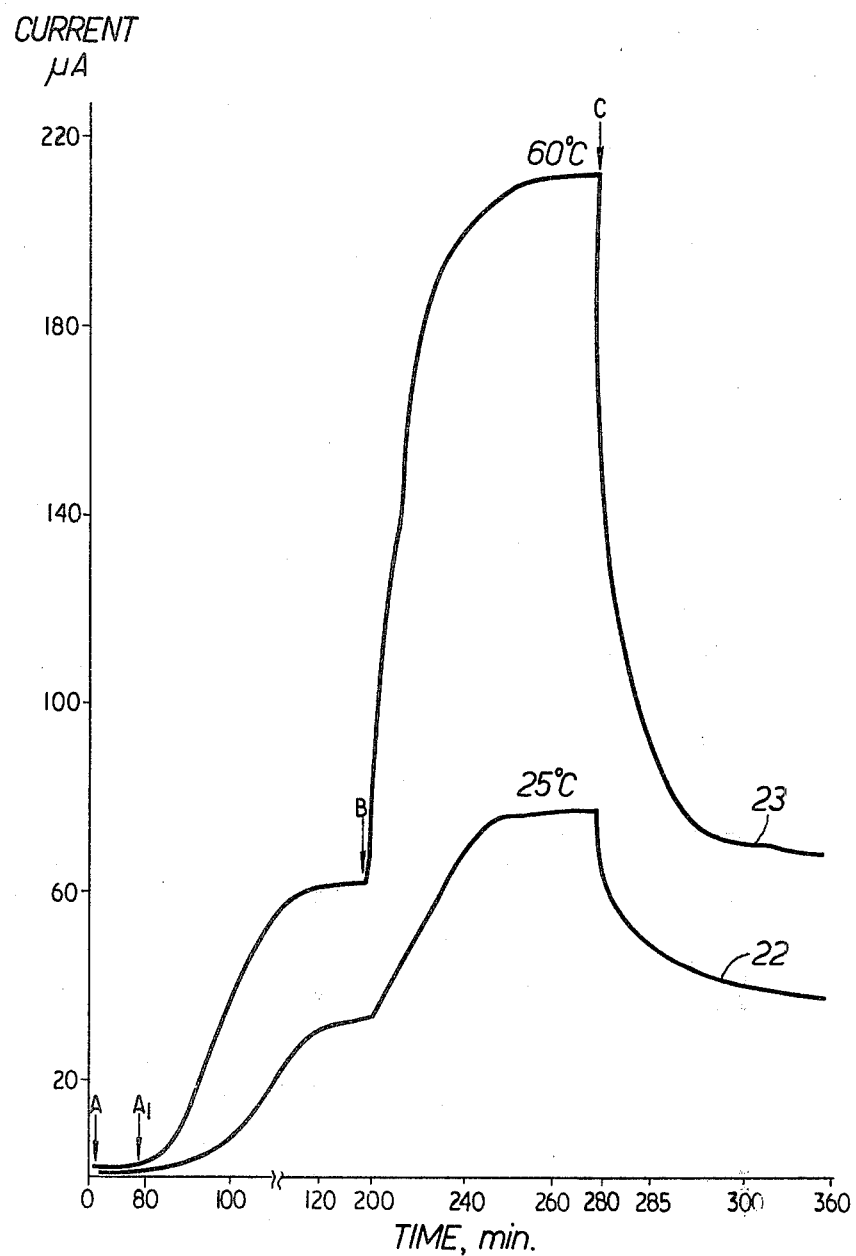

Finally, FIG. 10 shows the effect (as in FIG. 2) on the hydrogen diffusion rate through the steel membrane when it is connected/disconnected to an iron sulphide coated electrode. The tests were carried out in 3.5% NaCl solution at 25° C. (Curve 22) and 60° C. (curve 23), in the presence of $H_2S$. A represents the connection of the electrode to the membrane A, the introduction of $H_2S$, B disconnection and C reconnection.

These results show the marked effect of the iron-sulphide coated electrode on the rate of $H_2$ diffusion (ie on the rate of $H_2$ evolution on the steel membrane) and confirm the suitability of iron sulphide as an active substance for use in the present invention. In all cases, the surface area of the iron sulphide coating was at least 10 times the geometric surface area of the steel membrane.

It will be appreciated that the present invention is especially applicable to the protection of gas and oil pipelines, and that in one advantageous embodiment there is provided a gas or oil pipeline component at least part of the surface of which is provided with a first coating comprising an active substance selected from FeS and a mixed sulphide of the general formula

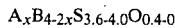

wherein x is 0.05 to 1.95 and A and B are any different two metals from cobalt, nickel, iron and manganese, preferably $NiCo_2S_4$, said active substance advantageously being dispersed in an inert binder, such as polytetrafluoroethylene, and a second protective non-conductive and impervious coating, such as a fusion-bonded epoxy resin coating, over said first coating.

However, it will also be appreciated from the above description that the invention is not limited to such applications and other modifications and variations will be apparent to those skilled in the art.

We claim:

1. A method of protecting a metal substrate in a corrosive environment against hydrogen embrittlement, which comprises applying over said substrate and in electrical contact therewith a first coating comprising an active metallic sulfide, and applying over said first coating a second protective coating.

2. A method as claimed in claim 1, wherein said first coating comprises a dispersion of the active substance in an inert binder.

3. A method as claimed in claim 1, wherein said first layer has a thickness in the range of from 0.001 cm to 0.01 cm.

4. A method as claimed in claim 1, wherein said protective coating is a non-conducting impervious polymer coating.

5. A method as claimed in claim 4, wherein the protective coating comprises an epoxy resin.

6. A method as claimed in claim 1, wherein the sulphide is $NiCo_2S_4$.

7. A method as claimed in claim 1, wherein the sulphide is dispersed in a polytetrafluoroethylene binder.

8. A method as claimed in claim 1, wherein the surface area of the sulfide is at least 2 $m^2/g$.

9. A method as claimed in claim 8, wherein the surface area of the sulfide is at least 4 $m^2/g$.

10. A method as claimed in claim 1, wherein the FeS is incorporated in a coating and the surface area of the coating is at least 5 times that of the geometric area of the protected surface of the metal substrate.

11. A method as claimed in claim 1, wherein the FeS is incorporated in a coating and the surface area of the coating is at least 10 times that of the geometric area of the protected surface of the metal substrate.

12. A method as claimed in claim 1, wherein the metal substrate is an iron or steel substrate.

13. A method as claimed in claim 1, wherein the metal substrate is a pipeline or a part thereof.

14. A gas or oil pipeline component at least part of the surface of which is provided with a first coating comprising an active substrate selected from FeS and a mixed sulphide of the general formula $$A_xB_{(4-2x)}S_{(3.6-4.0)}O_{(0.4-0)}$$

wherein x is 0.05 to 1.95 and A and B are any two different metals from cobalt, nickel, iron and manganese, and a second protective, non-conductive and impervious coating over said first coating.

15. A gas or oil pipeline component as claimed in claim 14, wherein the sulphide is dispersed in an inert polymer binder.

16. A gas or oil pipeline component as claimed in claim 14, wherein the protective coating comprises an epoxy resin.

17. The component of claim 14, wherein said protective coating is a non-conducting impervious polymer coating.

18. A method as claimed in claim 1, wherein the sulfide has the general formula $A_xB_{(4-2x)}S_{(3.6-4.0)}O_{(0.4-0)}$ wherein x is 0.05 to 1.95 and A and B are any different two metals from cobalt, nickel, iron and manganese.

19. A method as claimed in claim 1, wherein the sulfide is FeS.

* * * * *

UNITED STATES PATENT AND TRADEMARK OFFICE
CERTIFICATE OF CORRECTION

PATENT NO. : 4,335,754
DATED : June 22, 1982
INVENTOR(S) : ALFRED C.C. TSEUNG et al It is certified that error appears in the above-identified patent and that said Letters Patent are hereby corrected as shown below:

In claims 10 and 11, at column 8, lines 35 and 39, "FeS" should read -- sulfide --.

In claim 14, at column 8, line 49, "substrate" should read -- substance --.

Signed and Sealed this

Tenth Day of April 1984

[SEAL]

Attest:

GERALD J. MOSSINGHOFF

Attesting Officer

Commissioner of Patents and Trademarks